United States Patent
Goldschmidt et al.

(10) Patent No.: US 9,279,596 B2
(45) Date of Patent: Mar. 8, 2016

(54) SYSTEMS AND METHODS FOR DAMPER PERFORMANCE DIAGNOSTICS

(71) Applicant: Johnson Controls Technology Company, Holland, MI (US)

(72) Inventors: Troy A. Goldschmidt, Brown Deer, WI (US); Dimitri S. Papadopoulos, Westwood, NJ (US)

(73) Assignee: Johnson Controls Technology Company, Holland, MI (US)

( * ) Notice: Subject to any disclaimer, the term of this patent is extended or adjusted under 35 U.S.C. 154(b) by 428 days.

(21) Appl. No.: 13/831,075

(22) Filed: Mar. 14, 2013

(65) Prior Publication Data
US 2014/0277773 A1 Sep. 18, 2014

(51) Int. Cl.
*F24F 11/04* (2006.01)
*G01F 25/00* (2006.01)
*G01F 1/36* (2006.01)
*F24F 11/00* (2006.01)
*G05B 23/02* (2006.01)

(52) U.S. Cl.
CPC . *F24F 11/04* (2013.01); *G01F 1/36* (2013.01); *G01F 25/00* (2013.01); *G01F 25/0007* (2013.01); *F24F 2011/0042* (2013.01); *F24F 2011/0052* (2013.01); *F24F 2011/0056* (2013.01); *F24F 2011/0091* (2013.01); *G05B 23/02* (2013.01); *G05B 2219/2614* (2013.01)

(58) Field of Classification Search
None
See application file for complete search history.

(56) References Cited

U.S. PATENT DOCUMENTS

| 6,223,544 | B1 | 5/2001 | Seem |
| 7,828,008 | B1 * | 11/2010 | Beckman et al. ......... 137/487.5 |
| 8,326,790 | B2 | 12/2012 | Macek et al. |
| 2004/0186599 | A1 * | 9/2004 | Ahmed et al. ............... 700/86 |
| 2010/0325488 | A1 | 12/2010 | Macek et al. |
| 2011/0115816 | A1 | 5/2011 | Brackney |
| 2011/0224883 | A1 * | 9/2011 | Bruno et al. ............... 701/102 |
| 2012/0245968 | A1 | 9/2012 | Beaulieu et al. |
| 2012/0262472 | A1 | 10/2012 | Garr et al. |
| 2013/0086010 | A1 | 4/2013 | Wenzel et al. |
| 2013/0161403 | A1 | 6/2013 | Douglas et al. |

FOREIGN PATENT DOCUMENTS

CA 2798396 6/2013

* cited by examiner

*Primary Examiner* — Kenneth M Lo
*Assistant Examiner* — Geoffrey Wellman
(74) *Attorney, Agent, or Firm* — Foley & Lardner LLP

(57) ABSTRACT

A computerized method for diagnosing a damper condition in a flow control unit includes providing a control signal to a damper. The control signal instructs the damper to move into a target position or to achieve a target flow rate through the flow control unit. The method further includes receiving pressure information including one or more pressure measurements from a differential pressure sensor of the flow control unit and using the pressure information and the control signal to conduct a damper performance diagnostic. The damper performance diagnostic includes at least one of: a stuck damper diagnostic, a predictive damper failure diagnostic, an improperly-sized damper diagnostic, and a damper leakage diagnostic.

18 Claims, 6 Drawing Sheets

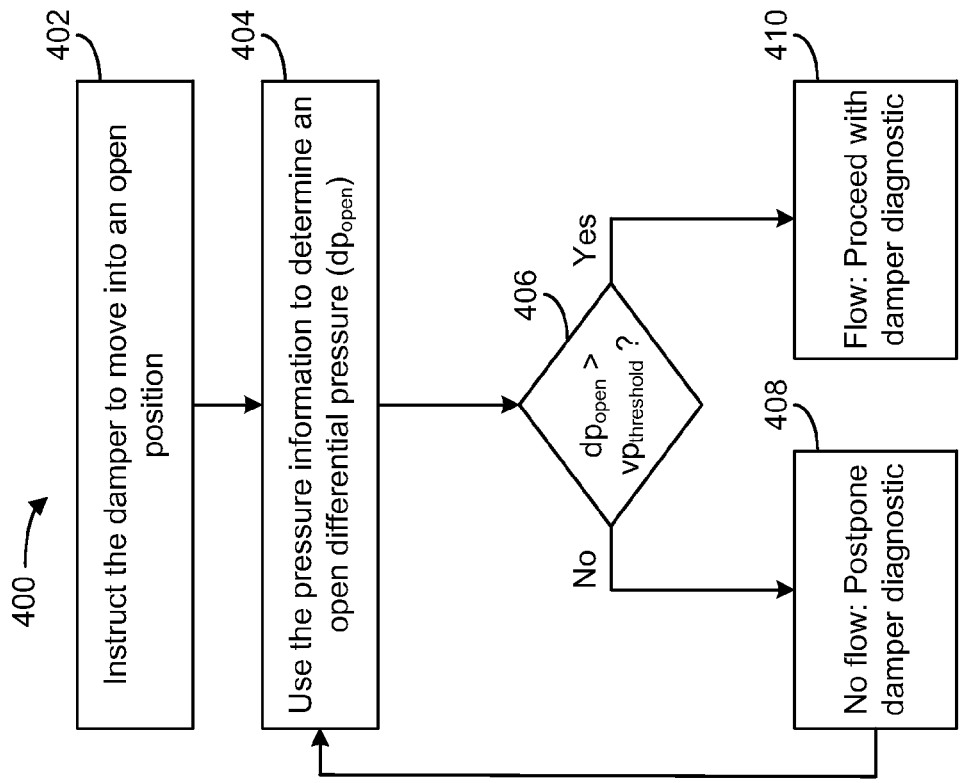
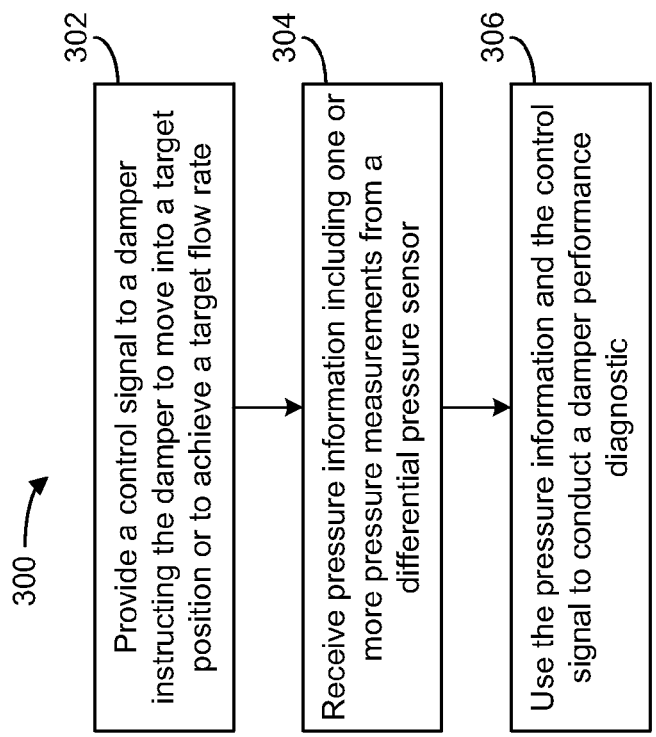

SYSTEMS AND METHODS FOR DAMPER PERFORMANCE DIAGNOSTICS

BACKGROUND

The present disclosure relates generally to the field of variable air volume (VAV) controllers for heating, ventilation, and air conditioning (HVAC) systems. The present disclosure relates more particularly to systems and methods for conducting damper performance diagnostics in a flow control unit.

Differential pressure (sometimes called dynamic pressure or velocity pressure) is defined as the difference between total pressure (e.g., stagnation pressure) and static pressure in a moving gas or fluid. Differential pressure may be thought of as a kinetic energy of the moving gas or fluid per unit volume. Differential pressure is related to gas or fluid velocity according to the equation $P_d=0.5\rho v^2$, where $\rho$ is the density of the gas or fluid and v is the gas or fluid velocity. Differential pressure may be determined by subtracting a measured static pressure from a measured stagnation pressure.

In a HVAC system, a flow control unit such as a variable air volume box or air handling unit may include a damper for regulating the rate of gas or fluid flow. The damper may variably open and close to adjust the flow rate of a controlled gas or fluid (e.g., air) through the flow control unit. Typical methods for assessing damper performance are conducted at a supervisory level within the HVAC system and often rely on data from multiple sensors in conducting the assessment. For example, a sensor measuring the air temperature in a building zone may supply temperature data used in the assessment. It is often difficult to determine whether a damper is operating properly based on such assessments.

SUMMARY

One implementation of the present disclosure is a computerized method for diagnosing a damper condition in a flow control unit. The method includes providing a control signal to a damper instructing the damper to move into a target position or to achieve a target flow rate through the flow control unit, receiving pressure information including one or more pressure measurements from a differential pressure sensor of the flow control unit, and using the pressure information and the control signal to conduct a damper performance diagnostic including at least one of a stuck damper diagnostic, a predictive damper failure diagnostic, an improperly-sized damper diagnostic, and a damper leakage diagnostic. In some embodiments, the damper performance diagnostic is conducted by a local controller for the flow control unit using only the pressure information as a measured variable.

In some embodiments, the damper performance diagnostics may be conducted after determining whether an air handler unit (AHU) for the flow control unit is currently active. Determining whether the AHU is active may include instructing the damper to move into an open position, using the pressure information to determine an open differential pressure, comparing the open differential pressure to a velocity pressure threshold, and determining that the AHU is inactive in response to the open differential pressure not exceeding the velocity pressure threshold. In some embodiments, in response to a determination that the AHU is inactive, the method further includes updating the open differential pressure based on updated pressure information received from the differential pressure sensor and repeating the 'comparing,' 'determining,' and 'updating' steps until the open differential pressure exceeds the velocity pressure threshold.

In some embodiments, the stuck damper diagnostic includes instructing the damper to move into a first position and using the pressure information to determine a first differential pressure, instructing the damper to move into a second position and using the pressure information to determine a second differential pressure, calculating a difference between the first differential pressure and the second differential pressure, and diagnosing a stuck damper condition in response to the difference not exceeding a stuck damper pressure threshold. In some embodiments, the first position is an open damper position and the second position is a closed damper position.

In some embodiments, the predictive damper failure diagnostic includes instructing the damper to move into a first position and using the pressure information to determine a first differential pressure and instructing the damper to move from the first position toward a second position. A time at which the damper begins moving may define a beginning of a movement interval and a time at which the damper stops moving may define an end of the movement interval. The predictive damper failure diagnostic may further include using the pressure information to determine a second differential pressure based on one or more of the pressure measurements measured at the end of the movement interval, calculating a rate of change between the determined differential pressures by dividing a difference between the first differential pressure and the second differential pressure by a duration of the movement interval, and predicting a damper failure in response to the rate of change not exceeding a threshold rate of change.

In some embodiments, the improperly-sized damper diagnostic includes receiving a damper size parameter, instructing the damper to move into an operating position and using the pressure information to determine a measure differential pressure, estimating an expected differential pressure based on the damper size parameter and the operating position, calculating a difference between the measured differential pressure and the expected differential pressure, and diagnosing an improperly-sized damper condition in response to the difference exceeding a differential pressure threshold.

In some embodiments, diagnosing an improperly-sized damper condition includes determining whether the measured differential pressure exceeds the expected differential pressure and either diagnosing that the damper size parameter is undersized in response to the measured differential pressure exceeding the expected differential pressure or diagnosing that the damper size parameter is oversized in response to the measured differential pressure not exceeding the expected differential pressure.

In some embodiments, the damper leakage diagnostic includes instructing the damper to move into a closed position and using the pressure information to determine a closed differential pressure, comparing the closed differential pressure to a differential pressure threshold, and diagnosing an excessive leakage damper condition in response to the closed differential pressure exceeding a differential pressure threshold.

Another implementation of the present disclosure is a system for diagnosing a damper condition in a flow control unit. The system includes a differential pressure sensor configured to obtain one or more pressure measurements in the flow control unit and controller configured to receive pressure information including the one or more pressure measurements and to provide a control signal to a damper. The control signal may instruct the damper to move into a target position or to achieve a target flow rate through the flow control unit. The controller may be further configured to use the pressure information and the control signal to conduct a damper performance diagnostic including at least one of a stuck damper diagnostic, a predictive damper failure diagnostic, an improperly-sized damper diagnostic, and a damper leakage diagnostic. In some embodiments, the controller is a local controller for the flow control unit and the damper performance diagnostic uses only the pressure information as a measured variable.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 3 is a flowchart of a process for diagnosing a damper condition in a flow control unit including at least one of a stuck damper condition, a predictive failure damper condition, an improperly-sized damper condition, and an excessive leakage damper condition, according to an exemplary embodiment.

FIG. 4 is a flowchart of a process for determining whether an air handling unit supplying airflow to the damper is currently active or inactive before performing the described damper performance diagnostics, according to an exemplary embodiment.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the figures, systems and methods for conducting damper performance diagnostics are shown, according to various exemplary embodiments. The systems and methods described herein may be used to diagnose a damper condition (e.g., a stuck damper, an improperly-sized damper, etc.), to predict a damper failure, and/or to determine whether a damper is experiencing excessive leakage (e.g., air leaking through the damper when the damper is closed). The described systems and methods may also be used to evaluate damper performance (e.g., responsiveness, accuracy, etc.) or to establish a controllable range (e.g., a range of flow rates controllable using the damper).

Advantageously, the described systems and methods may conduct such damper performance diagnostics using only differential pressure as a measured variable. This advantage facilitates implementation of the damper performance diagnostics at a local controller level (e.g., a controller for a specific flow control unit, a field controller, etc.). For example, the described diagnostics may be performed by a local controller for a variable air volume (VAV) unit or an air handling unit (AHU) of a heating, ventilation, and air conditioning (HVAC) system. In some implementations the damper performance diagnostics may be conducted by self monitoring analytical reporting technology (SMART) equipment. SMART equipment may locally and independently perform the described diagnostics without relying on access to data from other equipment or devices (e.g., temperature data, power usage data, etc.). SMART equipment may diagnose a damper condition and report the result of such diagnostic to a supervisory control system.

Advantageously, by conducting the damper performance diagnostics on the local controller level, the local controller may be able to independently determine when a damper performance issue has occurred. This eliminates the need to send or receive data used to conduct the damper performance diagnostics over a communications network (e.g., to a supervisory controller, etc.), thereby reducing an amount of unnecessary data traffic over the communications network. In other implementations, the damper performance diagnostics may be implemented in a higher level HVAC controller having access to data from more than one HVAC device or in a controller for a comprehensive building automation system (BAS) such as a METASYS® brand system, sold by Johnson Controls Inc.

Figure 1:
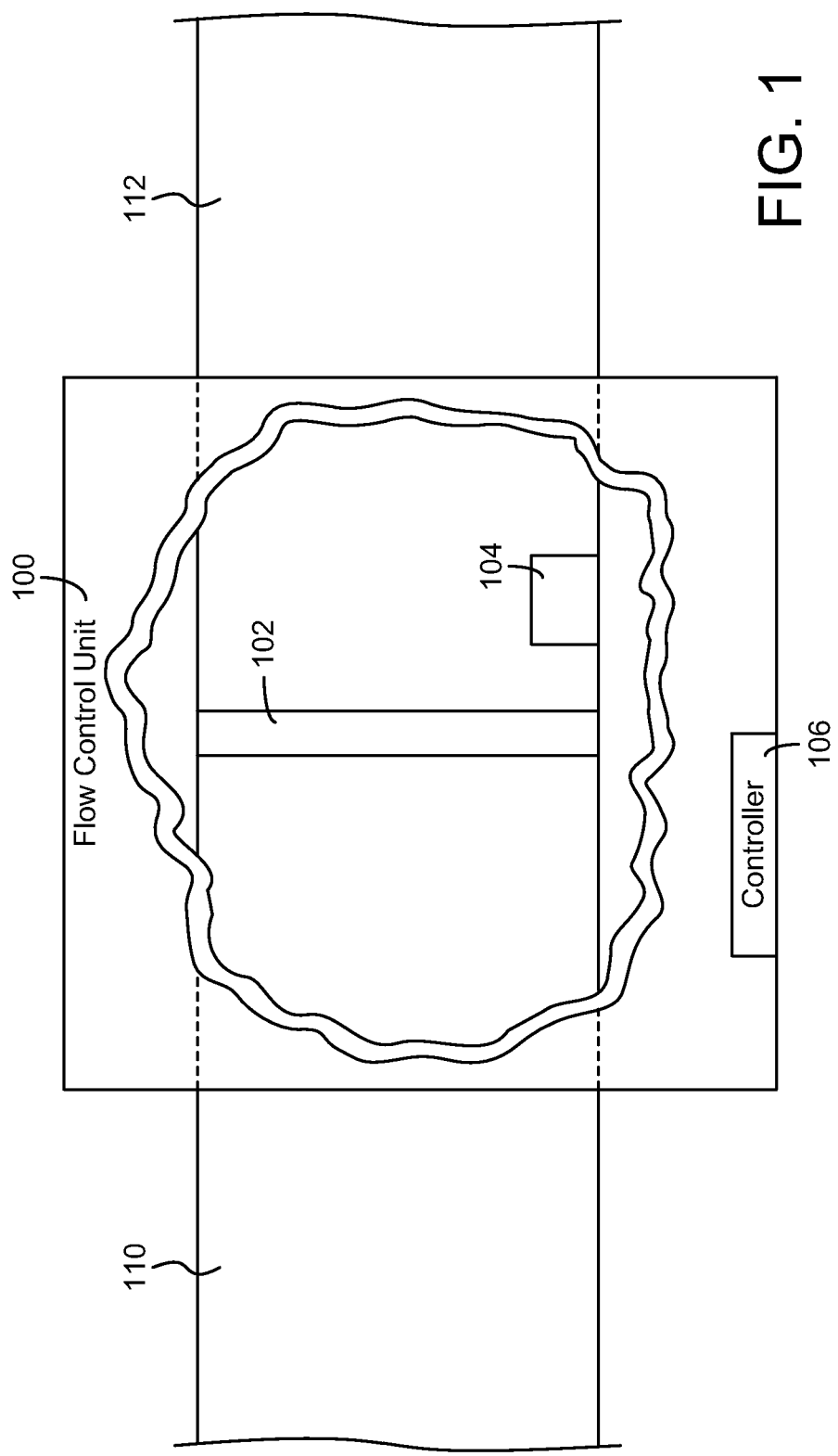
FIG. 1 is a block diagram of a flow control unit including a damper, a pressure sensor, and a controller, according to an exemplary embodiment.

Referring now to FIG. 1, a drawing of a flow control unit 100 is shown, according to an exemplary embodiment. Flow control unit 100 may be used to control airflow in a HVAC system. In some embodiments, flow control unit 100 is a terminal unit (e.g., a VAV box). Flow control unit 100 may be used to control an airflow rate into a particular zone, room, floor, or other area in a building or building system. For example, as a terminal unit, flow control unit 100 may be used to cut off air conditioning, heating, or cooling to an used zone or to control heating, ventilating, and air conditioning on a zone-by-zone basis. In other embodiments, flow control unit 100 may be an upstream unit (e.g., an AHU, a rooftop unit (RTU), etc.). Flow control unit 100 may be located proximate to a supplied zone (e.g., as a terminal unit) or elsewhere within a HVAC system (e.g., a rooftop, basement, etc.). Flow control unit 100 may include one or more fans, blowers, heating elements, cooling elements, humidity control elements, filtration elements, or other components, according to various implementations.

In some embodiments, flow control unit 100 is connected to one or more air ducts. For example, flow control unit 100 may receive airflow from a first duct 110 and output the airflow into a second duct 112. In other embodiments, flow control unit 100 may receive airflow from duct 110 and output the airflow freely into a controlled zone. In further embodiments, flow control unit 100 may receive airflow from an open zone and output the airflow into duct 112.

Still referring to FIG. 1, flow control unit 100 is shown to include a damper 102, a pressure sensor 104, and a controller 106. Damper 102 may be a plate or bellows that stop or regulate the flow of air between ducts 110 and 112. In some embodiments, damper 102 is an automatic damper. For example, damper 102 may include an electric motor, a solenoid, or other electric or electromagnetic actuator for selectively opening and closing damper 102. By variably opening and closing, damper 102 may regulate the flow rate (e.g., volumetric flow rate, flow velocity, mass flow rate) through flow control element 100.

Damper 102 may receive a control signal from controller 106. In some embodiments, the control signal may instruct damper 102 to move into a target position (e.g., a completely open position, a completely closed position, a 25% open position, a 62% open position, etc.). In other embodiments, the control signal may instruct damper 102 to achieve a target flow rate through flow control unit 100. Damper 102 may translate a target flow rate into a target damper position by referencing a conversion table, a translation function, or stored calibration data. In other embodiments, damper 102 may include feedback control functionality. For example, damper 102 may use a feedback flow rate signal to adaptively adjust a damper position to achieve the target flow rate. When functioning normally, damper 102 may respond to the control signal by opening or closing to move into the target position or to achieve the target flow rate.

Still referring to FIG. 1, flow control unit 100 is shown to include a pressure sensor 104. Pressure sensor 104 may be a differential pressure sensor configured to obtain one or more pressure measurements in flow control unit 100. Pressure sensor 104 may measure pressure using any pressure sensing technique. For example, pressure sensor 104 may include a piezoresistive strain gauge, a capacitive strain gauge, or measure pressure via the piezoelectric effect. In some embodiments, pressure sensor 104 may make use of electromagnetic principles (e.g., the Hall Effect, eddy currents, changes in inductance, etc.), optical principles, resonant principles, and/or thermal principles to measure pressure via a force collection technique.

Pressure sensor 104 may measure absolute pressure or gauge pressure (e.g., relative to atmospheric pressure). Pressure sensor 104 may produce a voltage or current in response to a measured pressure. In some embodiments, pressure sensor 104 includes an analog-to-digital converter for converting an analog voltage measurement into a digital value. Pressure sensor 104 may include functionality to convert a voltage value into a pressure measurement (e.g. a conversion table, a translation function, etc.). In other embodiments, pressure sensor 104 outputs raw voltage values for subsequent processing (e.g., by controller 106). Pressure sensor 104 may communicate pressure information (e.g., pressure values, voltage values from which pressure may be determined, etc.) to controller 106.

The pressure measurements obtained by pressure sensor 104 may be used to determine a differential pressure $P_d$ (e.g., a velocity pressure, a dynamic pressure, etc.) of the gas or fluid flow through flow control unit 100. Differential pressure $P_d$ is defined as the difference between total pressure $P_{total}$ (e.g., a stagnation pressure along a streamline) and a static pressure $P_s$ (e.g., $P_d = P_{total} - P_s$). Total pressure $P_{total}$ and static pressure $P_s$ can be measured directly using a pressure sensor 104. For example, total pressure $P_{total}$ can be measured by orienting pressure sensor 104 to measure pressure in the direction of gas or fluid flow. Static pressure $P_s$ can be measured by orienting pressure sensor 104 to measure pressure in a direction perpendicular to the direction of gas or fluid flow. Differential pressure $P_d$ can then be determined by subtracting static pressure $P_s$ from total pressure $P_{total}$.

In some embodiments, pressure sensor 104 and/or flow control unit 100 may include multiple pressure sensors for measuring total pressure $P_{total}$ and static pressure $P_s$ simultaneously. In some embodiments, pressure sensor 104 is a unidirectional pressure sensor. In other embodiments, pressure sensor 104 may be a multidirectional pressure sensor as described in U.S. patent application Ser. No. 13/668,146, titled "Methods and Systems for Determining Flow Direction Using a Bidirectional Pressure Sensor." Pressure sensor 104 may be installed upstream, downstream, or both upstream and downstream (e.g., using multiple pressure sensors 104) of damper 102.

Still referring to FIG. 1, flow control unit 100 is shown to include a controller 106. Controller 106 may be configured to receive the pressure information (e.g., static pressure $P_s$, total pressure $P_{total}$, differential pressure $P_d$, voltage values from which a pressure may be determined, etc.) from pressure sensor 104. Controller 106 may use the pressure information to determine a differential pressure $P_d$.

Controller 106 may be configured to provide a control signal to damper 102. In some embodiments, the control signal instructs damper 102 to move into a target position. Controller 106 may calculate the target position for damper 102 based on a target flow rate. The target flow rate may be received from a higher level controller (e.g., a supervisory HVAC controller, a BAS controller, etc.), specified by a user, or calculated by controller 106 based on information received from one or more building management system (BMS) devices (e.g., a temperature sensor, a humidity sensor, another pressure sensor, etc.). In some embodiments, controller 106 translates the target flow rate into a target damper position and provides the target damper position via the control signal to damper 102. Translating the target flow rate into a target damper position may be accomplished by referring to damper configuration data (e.g., a damper size parameter, a conversion formula, a translation table, etc.). Controller 106 may include feedback control functionality for adaptively adjusting the damper position based on an empirically determined flow rate. In other embodiments, the target damper position may be determined by damper 102, controller 106, or a higher level (e.g., supervisory) controller.

Controller 106 may be configured to conduct a damper performance diagnostic using the pressure information and the control signal. The damper performance diagnostic may include at least one of a stuck damper diagnostic, a predictive damper failure diagnostic, an improperly-sized damper diagnostic, and a damper leakage diagnostic. Advantageously, controller 106 may conduct the damper performance diagnostics using only the pressure information as a measured input. In other words, controller 106 may not require any other measurements (e.g., temperature measurements, input from other BMS devices, etc.) to perform the diagnostics. This advantage may facilitate implementation of the damper diagnostics on a local controller level (e.g., by controller 106) rather than on higher levels in the control system. Controller 106 may diagnose a stuck damper condition, an improperly-sized damper condition (e.g., an oversized damper, an undersized damper, etc.), an excessive leakage damper condition, or predict a damper failure based on a result of the diagnostics.

Advantageously, by conducting the damper performance diagnostics on the local controller level, controller 106 may be able to independently determine when a damper performance issue has occurred. This eliminates the need to send or receive data used to conduct the damper performance diagnostics over a communications network (e.g., to a supervisory controller, etc.), thereby freeing network resources for other applications. In some embodiments, controller 106 may limit outgoing data requests and/or data reporting (e.g., to a supervisory controller, over the communications network, etc.) in response to a diagnosed damper performance issue. For example, controller 106 may replace normal data communications with a result of the damper performance diagnostic, thereby reducing an amount of unnecessary data traffic over the communications network Although FIG. 1 shows controller 106 as part of flow control unit 100, in other embodiments controller 106 may be a controller for a plurality of HVAC devices, a supervisory controller for a plurality of BMS subsystems, or implemented as part of a cloud-hosted suite of building management applications (e.g., a PANOPTIX® brand building management suite, as sold by Johnson Controls, Inc.).

Figure 2:
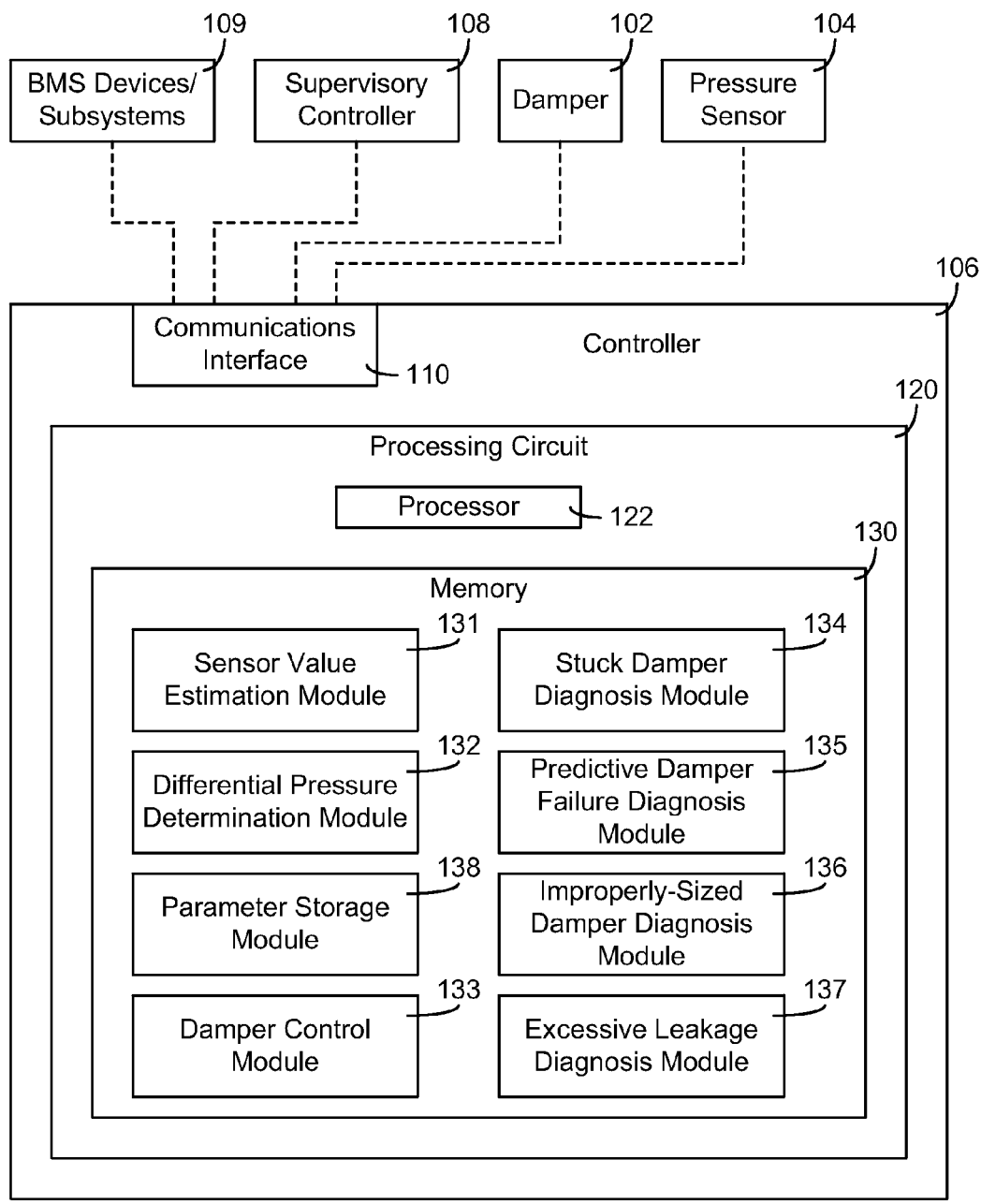
FIG. 2 is a block diagram showing the controller of FIG. 1 in greater detail, according to an exemplary embodiment.

Referring now to FIG. 2, a detailed block diagram of controller 106 is shown, according to an exemplary embodiment. Controller 106 is shown to include a communications interface 110, and a processing circuit 120. Communications interface 110 can be or include wired or wireless interfaces (e.g., jacks, antennas, transmitters, receivers, transceivers, wire terminals, etc.) for conducting data communications with, for example, damper 102, pressure sensor 104, supervisory controller 108, BMS devices/subsystems 109, or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 110 can include an Ethernet card and port for sending and receiving data via an Ethernet-based communications link or network. In another example, communications interface 110 can include a WiFi transceiver or a cellular or mobile phone transceiver for communicating via a wireless communications network.

Still referring to FIG. 2, processing circuit 120 is shown to include a processor 122 and memory 130. Processor 122 can be implemented as a general purpose processor, an application specific integrated circuit (ASIC), one or more field programmable gate arrays (FPGAs), a group of processing components, a microcontroller, or other suitable electronic processing components. Memory 130 (e.g., memory device, memory unit, storage device, etc.) is one or more devices (e.g., RAM, ROM, solid state memory, hard disk storage, etc.) for storing data and/or computer code for completing or facilitating the various processes, layers and modules described in the present application.

Memory 130 may be or include volatile memory or non-volatile memory. Memory 130 may include database components, object code components, script components, or any other type of information structure for supporting the various activities and information structures described in the present application. According to an exemplary embodiment, memory 130 is communicably connected to processor 122 via processing circuit 120 and includes computer code for executing (e.g., by processing circuit 120 and/or processor 122) one or more processes described herein. Memory 130 is shown to include a sensor value estimation module 131, a differential pressure determination module 132, a damper control module 133, and a parameter storage module 138. Memory 130 is further shown to include a plurality of damper performance diagnosis modules including a stuck damper diagnosis module 134, a predictive damper failure diagnosis module 135, an improperly-sized damper diagnosis module 136, and an excessive leakage diagnosis module 137.

Sensor value estimation module 131 may include instructions for receiving pressure information from pressure sensor 104. In some embodiments, the pressure information may be received as an analog data signal. Sensor value estimation module 131 may include an analog-to-digital converter for translating the analog signal into a digital data value. Sensor value estimation module 131 may segment a continuous data signal into discrete measurement values by sampling the pressure information periodically (e.g., once per second, once per millisecond, once per minute, etc.). In some embodiments, the pressure information may be received as a measured voltage from pressure sensor 104. Sensor value estimation module 131 may convert the voltage values into pressure measurements using a conversion formula, a translation table, or other conversion criteria.

In some embodiments, sensor value estimation module 131 may attach a time stamp to the received pressure information to organize the data by time. If multiple pressure sensors 104 are used to obtain the pressure information, module 131 may assign an identifier (e.g., a label, tag, etc.) to each measurement to organize the data by source. For example, the identifier may signify whether the pressure information is received from a pressure sensor measuring a total pressure, a sensor measuring a static pressure, or whether the pressure information represents a calculated differential pressure.

Still referring to FIG. 2, memory 130 is shown to include a differential pressure determination module 132. Module 132 may use the pressure information received from sensor 104 (and converted into digital pressure values by sensor value estimation module 131) to determine a differential pressure $P_d$ of the gas or fluid flow through flow control unit 100. If the converted pressure information includes a total pressure $P_{total}$ and a static pressure $P_s$, differential pressure determination module 132 may calculate a differential pressure $P_d$ by subtracting static pressure $P_s$ from total pressure $P_{total}$ (e.g., $P_d = P_{total} - P_s$).

In some embodiments, modules 131 and/or 132 may not be present or may not be used to prepare the pressure information for further processing. For example, some differential pressure sensors may output an analog or digital value proportional to differential pressure $P_d$. If the pressure information is received in such a condition, the aforementioned subtraction may not be performed. Differential pressure determination module 132 may produce a differential pressure value for use by one or more of damper performance diagnosis modules 134-137.

Still referring to FIG. 2, memory 130 is shown to include a stuck damper diagnosis module 134. Module 134 may be used to diagnose a stuck damper condition for damper 102. A stuck damper condition may occur when damper 102 fails to respond to a control signal instructing damper 102 to move into a target position. In other words, the damper becomes inoperable. A stuck damper may be caused, for example, by a damper actuator failure (e.g., a mechanical or electrical failure, a loss of power, etc.), a physical obstruction preventing damper movement, or a communication failure between damper 102 and controller 106.

A damper becoming stuck in an open position may cause excessive heating or cooling to be applied to a building zone. Excessive heating or cooling may result in uncomfortable temperatures and/or unnecessary energy use. For example, excessive cooling may trigger the activation of a heating element in order to maintain the desired temperature setpoint, thereby consuming unnecessary energy (e.g., cooling energy and counterbalancing heating energy). A damper becoming stuck in a closed position may cause a lack of airflow to a building zone. The lack of airflow may result in uncomfortable zone temperatures and poor indoor air quality.

Stuck damper diagnosis module 134 may detect a stuck damper condition such that the inoperable damper may be repaired or replaced. Advantageously, performing the stuck damper diagnostic process on the local controller level may identify a specific damper for maintenance without requiring further investigation. Performing the stuck damper diagnostic on the local controller level may also enable controller 106 to stop requesting or reporting unnecessary data (e.g., data used only to conduct the stuck damper diagnostic) to a supervisory controller, thereby reducing an amount of data transferred over the communications network. A detailed stuck damper diagnostic process is described with reference to FIG. 5.

Still referring to FIG. 2, memory 130 is shown to include a predictive damper failure diagnosis module 135. Module 135 may be used to predict a damper failure for damper 102 (e.g., damper 102 becoming stuck or inoperable) before such failure occurs. A damper failure may be predicted when the damper is slow to respond to a control signal or takes longer than expected to move into a target position. A predicted damper failure condition may be caused, for example, by a faulty actuator, damaged or aging equipment, a failing power supply, or a loose or slipping set screw.

A damper in the predicted failure condition may result in sub-optimal control or inefficient power usage while not qualifying as a stuck damper. For example, the damper may not effectuate a control action until after the ideal time for such action has passed and/or consume additional power in moving between target positions. Advantageously, predicting a damper failure before such failure occurs may allow the damper to be repaired or replaced before the damper becomes completely inoperable. A detailed predictive damper failure diagnostic process is described with reference to FIG. 6.

Still referring to FIG. 2, memory 130 is shown to include an improperly-sized damper diagnosis module 136. Module 136 may be used to diagnose an improperly-specified damper size parameter for damper 102. For example, when a flow control unit is initially configured, a damper size parameter (e.g., a damper cross-sectional area, a flow duct area, a VAV box size, etc.) may be specified as a software variable of the local controller. If the damper size parameter is incorrect (i.e., does not correspond to the actual damper size), or controller 106 may respond improperly to a control signal instructing damper 102 to effectuate a received or calculated target flow rate.

For example, the target flow rate may be translated into a damper position (e.g., 10% open, 40% open, 90% open, etc.) based on the specified damper size parameter. If the damper size parameter is large (e.g. specifying a 15 $ft^2$ cross-sectional area), the translation process may determine that damper 102 should be opened by a small amount (e.g., 10%) in order to achieve the target flow rate. If the damper size parameter is small (e.g., specifying a 3 $ft^2$ cross-sectional area), the translation process may determine that damper 102 should be opened by a larger amount (e.g., 50%) in order to achieve the target flow rate.

An undersized damper condition (e.g., a damper size parameter significantly smaller than the actual damper size) may cause damper 102 to open more than necessary to achieve the target flow rate. An undersized damper may cause excessive heating or cooling to be applied to a building zone, potentially wasting energy and/or causing uncomfortable zone temperatures. An oversized damper condition (e.g., a damper size parameter significantly larger than the actual damper size) may cause damper 102 to open less than necessary to achieve the target flow rate. An oversized damper may cause inadequate airflow to be applied to a building zone. Inadequate airflow may result in uncomfortable zone temperatures and poor indoor air quality.

Advantageously, improperly-sized damper diagnosis module 136 may determine whether damper 102 is undersized or oversized by comparing an expected flow rate with an empirically-determined flow rate. A determination that damper 102 is improperly-sized may cause the damper size parameter and/or damper 102 to be flagged for inspection. Module 136 may facilitate a coordination between damper hardware (e.g., an actual damper size) and damper software (e.g., a damper size parameter), thereby resulting in improved control functionality. A detailed improperly-sized damper diagnostic process is described with reference to FIG. 7.

Still referring to FIG. 2, memory 130 is shown to include an excessive leakage diagnosis module 137. Module 137 may be used to diagnose an excessive leakage damper condition for damper 102. The excessive leakage damper condition may occur when damper 102 inadequately prevents airflow through flow control unit 100 when damper 102 is in a completely closed position. Excessive leakage may be caused, for example, by a physical obstruction preventing damper 102 from completely closing, a faulty actuator, an improperly-calibrated operating range, or inconsistency between the hardware and software configuration.

For example, during an automated sensor calibration process, damper 102 may be instructed to move into a completely closed position. Sensor 104 may be calibrated by recording a differential pressure reading when damper 102 is thought to be completely closed and subtracting the recorded differential pressure from all subsequent differential pressure values output by sensor 104. If damper 102 is not completely closed when the calibration process is performed or if excessive leakage occurs despite damper 102 being completely closed, the subsequent differential pressure measurements obtained from sensor 104 may be inaccurate. Inaccurate pressure measurements may cause suboptimal control functionality, potentially resulting in undesirable performance or unnecessary energy use. Excessive leakage diagnosis module 137 may detect excessive leakage in damper 102 (e.g., a leakage exceeding an acceptable value). Such detection may flag the damper 102 for closer inspection, repair, or replacement, thereby improving control functionality. A detailed excessive damper leakage diagnostic process is described with reference to FIG. 8.

Still referring to FIG. 2, memory 130 is shown to include a parameter storage module 138. Module 138 may store threshold parameter information used by damper diagnosis modules 134-137 in performing the various diagnostic tests. For example, parameter storage module 138 may store a stuck damper pressure threshold value. Stuck damper diagnosis module 134 may compare the stuck damper pressure threshold with a difference between two differential pressure values (e.g., a differential pressure obtained after damper 102 has been instructed to move into an open position and a differential pressure reading after damper 102 has been instructed to move into a closed position). If the stuck damper pressure threshold exceeds the difference, stuck damper diagnosis module 134 may diagnose a stuck damper condition for damper 102.

In some embodiments, parameter storage module 138 may store configuration settings for damper 102. Configuration settings may include a damper size parameter value. The damper size parameter may be used by improperly-sized damper diagnosis module 136 in determining an expected differential pressure for a given damper position. A determination that the expected differential pressure differs significantly from an actual differential pressure measurement (e.g., the difference between the expected differential pressure and the actual differential pressure exceeds a threshold value) may imply that the damper size parameter has been improperly specified.

In some embodiments, parameter storage module 138 may store a velocity pressure threshold for damper 102. The velocity pressure threshold may be used to determine whether an AHU for the flow control unit is currently active or inactive before proceeding with damper diagnostic tests 134-137. For example, a differential pressure measurement may be obtained after damper 102 has been instructed to move into a completely open position. The differential pressure measurement may be compared with the velocity pressure threshold. In some embodiments, controller 106 may determine that the AHU is currently inactive (e.g., no airflow is occurring through flow control unit 100 despite damper 102 being completely open) in response to the differential pressure measurement not exceeding the velocity pressure threshold. Upon a determination that the AHU is currently inactive, controller 106 may pause diagnostic tests 134-137 until it is determined that the AHU has activated. In some embodiments, a differential pressure measurement not exceeding the velocity pressure threshold may indicate that damper 102 is stuck in a closed position, another upstream damper is closed, or another condition is preventing flow through flow control unit 100.

Referring now to FIG. 3, a flowchart of a process 300 for diagnosing a damper condition in a flow control unit is shown, according to an exemplary embodiment. Advantageously, process 300 may be performed by a local controller for the flow control unit. For example, process 300 may be performed by a controller for an individual variable air volume unit or an individual air handler unit. In some embodiments, process 300 may diagnose a damper condition using only the pressure information as a measured variable.

Process 300 is shown to include providing a control signal to a damper (step 302). The control signal may instruct the damper to move into a target position or to achieve a target flow rate. The control signal may be received from a local controller for the flow control unit or from a higher level (e.g., supervisory) controller. In some embodiments, a feedback control technique may be used to achieve the target flow rate. For example, the damper or a controller for the damper may receive a feedback signal from a downstream sensor (e.g., a flow rate sensor, a differential pressure sensor, etc.) The damper may adaptively open or close based on the feedback signal to achieve the target flow rate. If the damper is operating properly, the damper may respond to the control signal by activating an actuator (e.g., an electric motor, a solenoid, etc.) configured to affect the damper position. Under some circumstances, the damper may not respond properly to the control signal. For example, if the damper is stuck or improperly configured, the damper may not move into the target position or achieve the target flow rate.

Still referring to FIG. 3, process 300 is shown to further include receiving pressure information including one or more pressure measurements from a differential pressure sensor (step 304). The differential pressure sensor may be any type of pressure sensor and may measure pressure using any pressure sensing technique. For example, the pressure sensor may include a piezoresistive strain gauge, a capacitive strain gauge, or measure pressure via the piezoelectric effect. In some embodiments, the pressure sensor may make use of electromagnetic principles (e.g., the Hall Effect, eddy currents, changes in inductance, etc.), optical principles, resonant principle, and/or thermal principles to measure pressure via a force collection technique.

In some embodiments, the pressure information is received from the differential pressure sensor as a voltage signal. For example, the pressure sensor may produce a voltage value in response to a measured pressure. The raw voltage values may be communicated to a controller for the flow control unit subsequent processing. The pressure sensor or controller may include an analog-to-digital converter for converting an analog voltage measurement into a digital value. In other embodiments, the pressure information is received from the pressure sensor as a converted pressure value. For example the pressure sensor may include functionality to convert a voltage value into a pressure measurement (e.g. a conversion table, a translation function, etc.). The converted pressure value (e.g., the pressure measurement) may be communicated to a controller for the flow control unit.

In some embodiments, the pressure information may include one or more values (e.g., voltage values, pressure values, etc.) proportional to a measured differential pressure $P_d$ (e.g., a velocity pressure, a dynamic pressure, etc.). In other embodiments, the pressure information may include information relating to a total pressure $P_{total}$ (e.g., a stagnation pressure along a streamline) and/or a static pressure $P_s$. Differential pressure $P_d$ can then be determined by subtracting static pressure $P_s$ from total pressure $P_{total}$ (e.g., $P_d = P_{total} - P_s$).

Still referring to FIG. 3, process 300 is shown to further include using the pressure information and the control signal to conduct a damper performance diagnostic (step 306). The damper performance diagnostic may include one or more of a stuck damper diagnostic, a predictive damper failure diagnostic, an improperly-sized damper diagnostic, and a damper leakage diagnostic. In some embodiments, step 306 may involve determining whether an AHU for the flow control unit is active or inactive prior to performing the various diagnostics. Step 306 may involve determining a measured differential pressure based on the pressure information. The measured differential pressure may be determined after instructing the damper to move into a desired position (e.g., an open position, a closed position, a partially open position, etc.).

In some embodiments, step 306 may involve comparing the measured differential pressure with a threshold pressure value. In other embodiments, step 306 may involve comparing a difference between two measured pressure values to a difference threshold. In further embodiments, step 306 may involve comparing a rate of change of the measured pressure values to a rate of change threshold. The result of the comparison may be used to diagnose at least one of a stuck damper condition, an improperly-sized damper condition, a leaky damper condition, or to predict a damper failure. The damper performance diagnostics are described in greater detail in reference to FIGS. 5-8.

Referring now to FIG. 4, a flowchart of a process 400 for determining whether the flow control unit is capable of affecting gas of fluid flow is shown, according to an exemplary embodiment. In some embodiments, process 400 may be performed prior to conducting the various damper performance diagnostics as a prerequisite to each diagnostic test. In other embodiments, process 400 may be considered as part of the diagnostics. In some embodiments, process 400 may be used to determine whether an air handling unit (AHU) providing airflow to the flow control unit is currently active or inactive. If the AHU is inactive, the flow control unit may be incapable of affecting airflow, regardless of the damper condition. Accordingly, process 400 may be performed to determine whether the various damper performance diagnostics will provide useful information in diagnosing a damper condition. In some embodiments, process 400 may be used to diagnose an upstream condition causing no flow through the flow control unit (e.g., a stuck closed upstream damper, a blockage in an upstream flow duct, etc.).

Process 400 is shown to include instructing the damper to move into an open position (step 402) and using the pressure information to determine an open differential pressure (e.g., $dp_{open}$) (step 404). In some embodiments, the open position may be a completely open damper position (e.g., 100% open). In other embodiments, the open position may be a partially open position (e.g., between a completely open position and a completely closed position). The damper may or may not move into the open position in response to the instruction. For example, if the damper is stuck, the damper may fail to respond to the instruction. The open differential pressure $dp_{open}$ may be determined (e.g., based on the pressure information received from the pressure sensor) after instructing the damper to move into the open position. In some embodiments, step 404 may involve waiting for a defined time period after instructing the damper to move into the open position before determining the open differential pressure $dp_{open}$. The waiting time may allow the damper to move into the open position before the measurement or measurements from which $dp_{open}$ is determined are obtained.

Still referring to FIG. 4, process 400 is shown to further include comparing the open differential pressure $dp_{open}$ with a velocity pressure threshold (e.g., $vp_{threshold}$)(step 406). The velocity pressure threshold $vp_{threshold}$ may be a minimum expected value for the open differential pressure $dp_{open}$ when air is flowing through the flow control unit. In some embodiments, $vp_{threshold}$ may be retrieved from memory (e.g., parameter storage module 138). The velocity pressure threshold may be specified by a user (e.g., manually input) or determined automatically based on a history of differential pressure measurements. In some embodiments, $vp_{threshold}$ may be selected to be greater than a potential maximum offset of the differential pressure sensor. Accordingly, a measured differential pressure $dp_{open}$ less than the velocity pressure threshold $vp_{threshold}$ may indicate that no flow is occurring through the flow control unit.

If the comparison conducted in step 406 determines that the measured differential pressure is not greater than the velocity pressure threshold (e.g., $dp_{open} \leq vp_{threshold}$), process 400 is shown to include determining that no flow is occurring through the flow control unit (step 408). No flow may be a result of an inactive AHU, a damper stuck in a closed position, an active but non-functional AHU, a closed upstream damper, or any other condition preventing flow through the flow control unit. If no flow is occurring, any pressure information received from the differential pressure sensor may not be useful in evaluating damper performance. For example, of no air is flowing through the flow control unit, the measured differential pressure may be approximately zero regardless of the damper position or damper condition. In some embodiments, step 408 may involve waiting for a defined time period (e.g., one hour, four hours, eight hours, etc.) and repeating steps 404-410. The waiting period may delay re-execution of steps 404-410 until the AHU has potentially become active at a future time. In other embodiments, step 408 may involve reporting that no flow is occurring to a supervisory controller or higher level control system. If a plurality of flow control units are consistently reporting no flow, the supervisory controller may diagnose an upstream condition (e.g., a faulty AHU, a stuck upstream damper, etc.). In some embodiments, step 410 may involve conducting additional diagnostics (e.g., at a local or supervisory controller level) to determine why no flow is occurring.

If the comparison conducted in step 406 determines that the measured differential pressure is greater than the velocity pressure threshold (e.g., $dp_{open} > vp_{threshold}$), process 400 is shown to include determining that flow is occurring through the flow control unit (step 410). Step 410 may indicate that an AHU for the flow control unit is active and airflow is currently reaching the flow control unit (e.g., no blockage in an upstream duct, no stuck closed upstream dampers, etc.). Step 410 may also indicate that the damper for the flow control unit conducting process 400 is not stuck in the closed position. If flow is occurring through the flow control unit, process 400 may terminate and one or more of the damper performance diagnostics may be conducted.

Figures 5, 6:
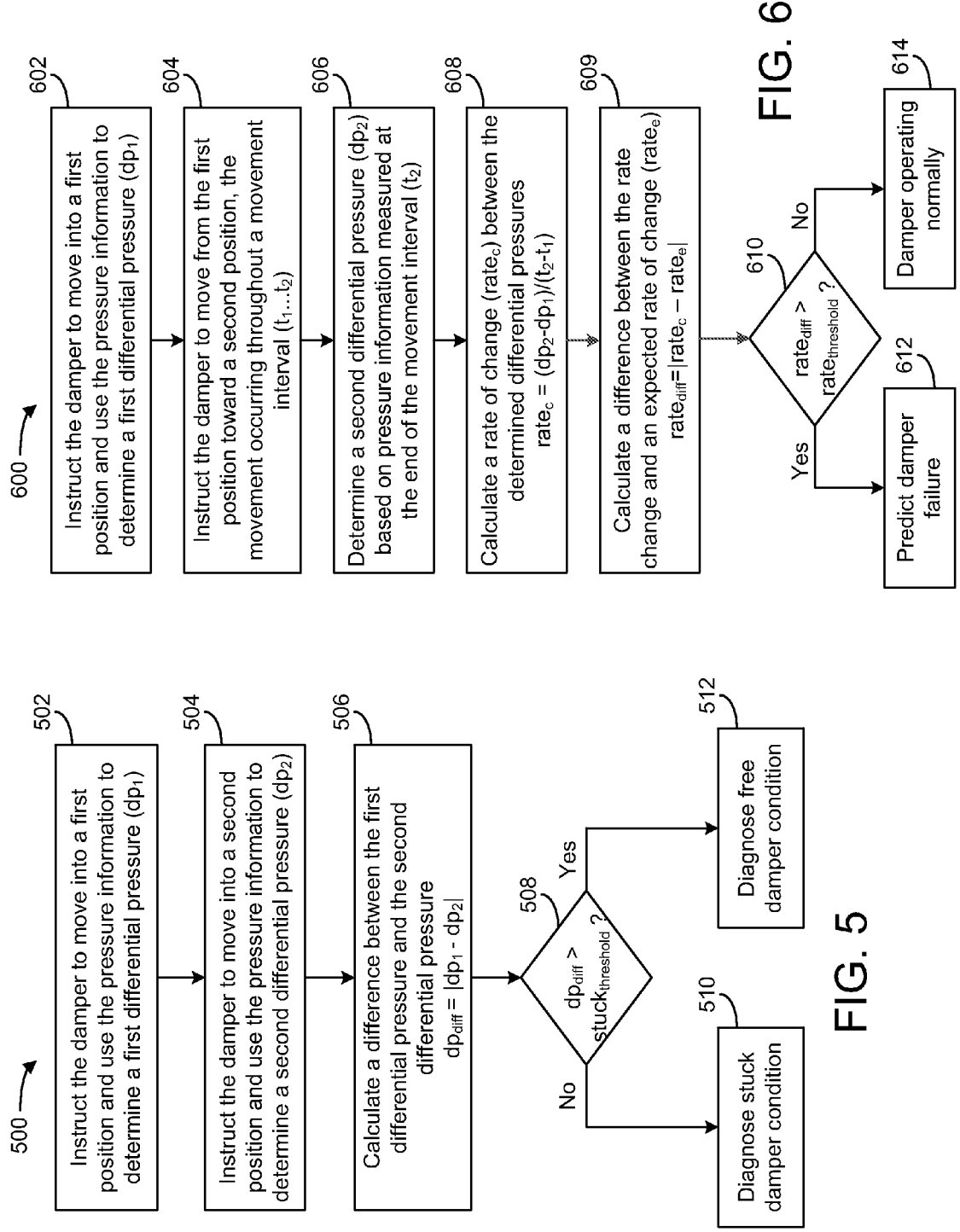
FIG. 5 is a flowchart of a process illustrating the stuck damper diagnostic, according to an exemplary embodiment.
FIG. 6 is a flowchart of a process illustrating the predictive damper failure diagnostic, according to an exemplary embodiment.

Referring now to FIG. 5, a flowchart of a process 500 for conducting the stuck damper diagnostic is shown, according to an exemplary embodiment. A stuck damper condition may occur when damper 102 fails to respond to a control signal instructing damper 102 to move into a target position. In other words, the damper becomes inoperable. A stuck damper may be caused, for example, by a damper actuator failure (e.g., a mechanical or electrical failure, a loss of power, etc.), a physical obstruction preventing damper movement, or a communication failure between the damper and a controller for the damper. Process 500 may be used to detect a stuck damper condition such that the inoperable damper may be repaired or replaced. Advantageously, performing the stuck damper diagnostic on the local controller level may identify a specific damper for maintenance without requiring further investigation.

Process 500 is shown to include instructing the damper to move into a first position and using the pressure information to determine a first differential pressure $dp_1$ (step 502). In some embodiments, the first position is a completely open damper position. The first differential pressure $dp_1$ may be determined after instructing the damper to move into the first position based on the pressure information received from the pressure sensor(s). In some embodiments, step 502 may involve waiting for a defined time period after instructing the damper to move into the first position before collecting the measurements used to determine the first differential pressure $dp_1$.

Process 500 is shown to further include instructing the damper to move into a second position and using the pressure information to determine a second differential pressure $dp_2$ (step 504). In some embodiments, the second position is a completely closed damper position. The second differential pressure $dp_2$ may be determined after instructing the damper to move into the second position based on the pressure information received from the pressure sensor(s). In some embodiments, step 504 may involve waiting for a defined time period after instructing the damper to move into the second position before collecting the measurements used to determine the second differential pressure $dp_2$.

In some embodiments, the damper may be instructed to move into a completely closed position only if other dampers associated with a shared AHU are at least partially open. This may prevent an over-pressurization that may occur if all dampers associated with the AHU are closed simultaneously. In some embodiments, a supervisory controller for the AHU may prevent all dampers from closing simultaneously. In some embodiments, the supervisory controller may prevent a damper from closing if other dampers associated with the AHU are already closed. In some embodiments, the supervisory controller may randomize the times at which process 500 or step 504 is performed such that not all dampers are closed simultaneously.

Still referring to FIG. 5, process 500 is shown to further include calculating a difference $dp_{diff}$ between the first differential pressure $dp_1$ and the second differential pressure $dp_2$ (step 506). The difference $dp_{diff}$ may represent a difference in flow rate (e.g., volumetric flow rate, gas or fluid velocity, etc.) through the flow control unit. In some embodiments, the difference $dp_{diff}$ may be calculated by subtracting $dp_2$ from $dp_1$ (e.g., $dp_{diff} = dp_1 - dp_2$). In other embodiments, the difference $dp_{diff}$ may be calculated by subtracting $dp_1$ from $dp_2$ (e.g., $dp_{diff}=dp_2-dp_1$). In further embodiments, the difference $dp_{diff}$ may be the absolute value of the difference between $dp_1$ and $dp_2$.

Process 500 is shown to further include comparing the difference $dp_{diff}$ with a stuck damper pressure threshold $stuck_{threshold}$ (step 508). The stuck damper pressure threshold may be specified by a user (e.g., manually input) or determined automatically based on a history of differential pressure measurements. If the difference is not greater than the stuck damper pressure threshold (e.g., $dp_{diff} \leq stuck_{threshold}$), process 500 is shown to include diagnosing a stuck damper condition (step 510). The stuck damper condition may indicate that the flow rate through the flow control unit has not changed significantly between instructing the damper to move into the first position (step 502) and instructing the damper to move into the second position (step 504). The stuck damper condition may indicate that the damper has not actually moved (i.e., the damper is stuck). If the difference is greater than the stuck damper pressure threshold (e.g., $dp_{diff} > stuck_{threshold}$, process 500 is shown to include diagnosing a free damper condition (step 512). The free damper condition may indicate that the flow rate through the flow control unit has changed significantly and that the damper is not stuck.

Referring now to FIG. 6, a flowchart of a process 600 for conducting the predictive damper failure diagnostic is shown, according to an exemplary embodiment. A predicted damper failure condition may be caused, for example, by a faulty actuator, damaged or aging equipment, a failing power supply, or a loose or slipping set screw. A damper in the predicted failure condition may result in sub-optimal control or inefficient power usage. For example, the damper may not effectuate a control action until after the ideal time for such action has passed and/or consume additional power in moving between target positions. Advantageously, predicting a damper failure before such failure occurs may allow the damper to be repaired or replaced before the damper becomes completely inoperable.

Process 600 is shown to include instructing the damper to move into a first position and using the pressure information to determine a first differential pressure $dp_1$ (step 602). In some embodiments, the first position is a completely open damper position. The first differential pressure $dp_1$ may be determined after instructing the damper to move into the first position based on the pressure information received from the pressure sensor(s). In some embodiments, step 602 may involve waiting for a defined time period after instructing the damper to move into the first position before collecting the measurements used to determine the first differential pressure $dp_1$.

Process 600 is shown to further include instructing the damper to move from the first position toward a second position (step 604). The movement between the first and second positions may occur throughout a movement interval. A time at which the damper begins moving $t_1$ may define a beginning of the movement interval. The end of the movement interval may be defined by a second time $t_2$. In some embodiments, time $t_2$ may be a time at which the damper stops moving. In other embodiments, the damper may continue to move after time $t_2$ (e.g., after the movement interval ends). In some embodiments, the damper may move continuously throughout the movement interval.

Still referring to FIG. 6, process 600 is shown to further include determining a second differential pressure $dp_2$ (step 606). The second differential pressure $dp_2$ may be determined based on pressure information measured at the end of the movement interval (e.g., at time $t_2$). For example, pressure measurements obtained at time $t_2$ may be used to calculate the second differential pressure $dp_2$. In some embodiments, the differential pressure may be allowed to stabilize before measuring the pressure information used to determine the second differential pressure $dp_2$. For example, step 606 may include waiting for a predetermined time period (e.g., a stabilization time $t_{stabilization}$) after time $t_2$ before measuring the second differential pressure $dp_2$. The stabilization time $t_{stabilization}$ may be specified by a user (e.g., manually input) or determined automatically (e.g., based on a history of differential pressure measurements, a damper size parameter, a damper movement rate, etc.).

Process 600 is shown to further include calculating a rate of change $rate_c$ between the determined differential pressures $dp_1$ and $dp_2$ (step 608). The rate of change $rate_c$ may be calculated by dividing the difference between the first differential pressure and the second differential pressure by a duration of the movement interval $$\left(\text{e.g., } rate_c = \frac{dp_2 - dp_1}{t_2 - t_1}\right).$$

The rate of change $rate_c$ may represent a rate at which the damper is able to adjust the flow through the flow control unit.

In some embodiments, process 600 further includes calculating a difference $rate_{diff}$ between an expected rate of change $rate_e$ and the calculated rate of change $rate_c$ (step 609). The expected rate of change may be specified by a user (e.g., manually input) or determined automatically (e.g., based on a history of collected data, previously calculated rates of change, damper size or configuration parameters, etc.). In some embodiments, the difference $rate_d$ may be calculated by subtracting $rate_c$ from $rate_e$ (e.g., $rate_{diff}=rate_e-rate_c$). In other embodiments, the difference $rate_{diff}$ be calculated by subtracting $rate_e$ from $rate_c$ (e.g., $rate_{diff}=rate_c-rate_e$). In further embodiments, the difference $rate_{diff}$ may be the absolute value of the difference between $rate_e$ and $rate_c$ (e.g., $rate_{diff}=|rate_e-rate_c|$).

Still referring to FIG. 6, process 600 is shown to further include comparing the difference $rate_{diff}$ with a threshold rate of change $rate_{threshold}$ (step 610). The rate of change threshold may represent a maximum allowable difference between $rate_e$ and $rate_c$ for the damper to be operating as expected. The rate of change threshold may be specified by a user (e.g., manually input) or determined automatically (e.g., based on a history of collected data, a statistical variance of $rate_c$, process noise, signal noise, etc.). If the difference does not exceed the rate of change threshold (e.g., $rate_{diff} \leq rate_{threshold}$), process 600 is shown to include determining that the damper is operating normally (step 614). If the difference exceeds the rate of change threshold (e.g., $rate_{diff} > rate_{threshold}$), process 600 is shown to include predicting a damper failure (step 612).

Figure 7:
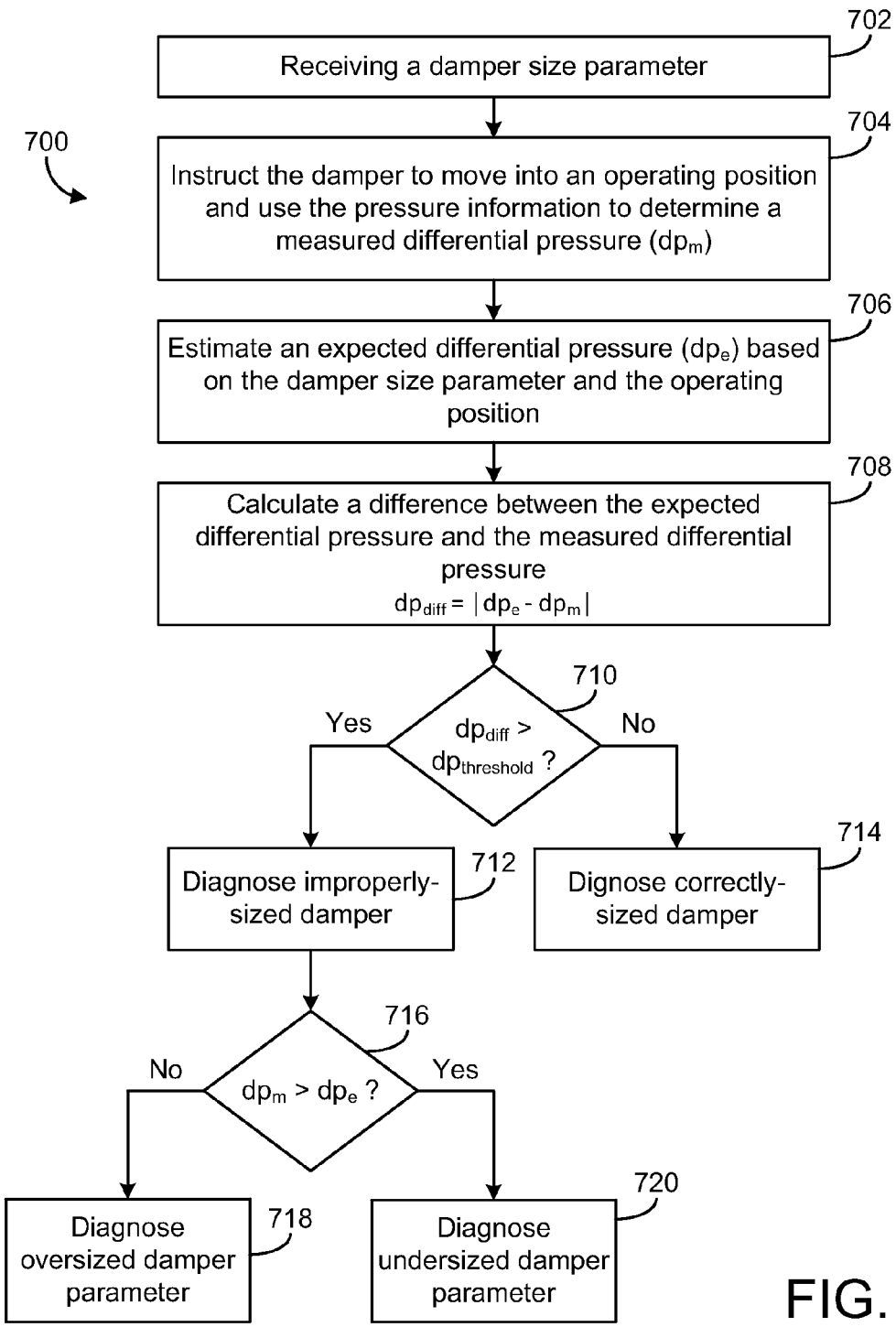
FIG. 7 is a flowchart of a process illustrating the improperly-sized damper diagnostic, according to an exemplary embodiment.

Referring now to FIG. 7, a flowchart of a process 700 for conducting the improperly-sized damper diagnostic is shown, according to an exemplary embodiment. Process 700 is shown to include receiving a damper size parameter (step 702). When a flow control unit is initially configured, the damper size parameter may be specified as a software variable. The damper size parameter may be a damper cross-sectional area, a flow duct area, a VAV box size, or other parameter corresponding to a damper size. If the damper size parameter is incorrect (i.e., does not correspond to the actual damper size), the damper may respond improperly to a control signal instructing the damper to effectuate a target flow rate. Process 700 may be used to determine that the damper size parameter has been incorrectly specified.

Process 700 is shown to further include instructing the damper to move into an operating position and using the pressure information to determine a measured differential pressure $dp_m$ (step 704). The operating position may be a completely open damper position or a partially open damper position. In some embodiments, the operating position may be specified in terms of a target flow rate. The measured differential pressure $dp_m$ may be determined after instructing the damper to move into the operating position based on the pressure information received from the pressure sensor(s). In some embodiments, step 704 may involve waiting for a defined time period after instructing the damper to move into the operating position before collecting the measurements used to determine the measured differential pressure $dp_m$.

Still referring to FIG. 7, process 700 is shown to further include estimating an expected differential pressure $dp_e$ based on the damper size parameter and the operating position (step 706). The operating position may be used to determine an expected velocity v of the gas or fluid moving through the flow control unit. For example, if the operating position is specified as a target flow rate (e.g., a volumetric flow rate, cubic feet per minute (CFM), etc.), the gas or fluid velocity v may be determined by dividing the flow rate CFM by the cross-sectional area of the damper $A_{damper}$ $$\left(e.g., v = \frac{CFM}{A_{damper}}\right).$$

In this example, the cross-sectional area $A_{damper}$ is the damper size parameter. If the operating position is specified as a target damper position, a translation function or lookup table may be used to convert a damper position to a volumetric flow rate. The expected differential pressure $dp_e$ may be proportional to the square of the gas or fluid velocity v. For example, $dp_e$ may be determined using the equation $dp_e=0.5\rho v^2$, where $\rho$ describes a density of the controlled gas or fluid.

In some embodiments, process 700 may be performed by a flow control unit which receives a gas or fluid having a constant static pressure. For example, some secondary systems (e.g., AHUs) are configured deliver air to a terminal unit (e.g., VAV units) such that the air on an upstream side of the terminal unit is maintained at a constant static pressure (e.g., one inch wc, etc.). In other embodiments, process 700 may be performed by a flow control unit which receives a gas or fluid having a variable static pressure. For example, some secondary systems may be configured to vary the static pressure on the upstream side of the terminal unit based on the demand created by the terminal unit or units connected to the secondary system. In some embodiments, step 706 includes accounting for either of these two scenarios in determining the expected differential pressure $dp_e$. For example, the static pressure on the upstream side of the damper may be used to determine an expected volumetric flow rate or gas or fluid velocity for a given damper position.

Process 700 is shown to further include calculating a difference $dp_{diff}$ between the expected differential pressure $dp_e$ and the measured differential pressure $dp_m$ (step 708). In some embodiments, the difference $dp_{diff}$ may be calculated by subtracting $dp_e$ from $dp_m$ (e.g., $dp_{diff}=dp_m-dp_e$). In other embodiments, the difference $dp_{diff}$ may be calculated by subtracting $dp_m$ from $dp_e$ (e.g., $dp_{diff}=dp_e-dp_m$). In further embodiments, the difference $dp_{diff}$ may be the absolute value of the difference between $dp_m$ and $dp_e$ (e.g., $dp_{diff}=|dp_e-dp_m|$).

Still referring to FIG. 7, process 700 is shown to further include comparing the difference $dp_{diff}$ with a differential pressure threshold $dp_{threshold}$ (step 710). The differential pressure threshold may be specified by a user (e.g., manually input) or determined automatically (e.g., based on a history of differential pressure measurements, variability data, process/signal noise, etc.). If the difference between the expected differential pressure and the measured differential pressure does not exceed the differential pressure threshold (e.g., $dp_{diff} \leq dp_{threshold}$), process 700 is shown to include diagnosing a correctly-sized damper (step 714). If the difference between the expected differential pressure and the measured differential pressure exceeds the differential pressure threshold (e.g., $dp_{diff} > dp_{threshold}$), process 700 is shown to include diagnosing an improperly-sized damper (e.g., the damper size parameter does not accurately describe the actual damper size) (step 712).

Process 700 is shown to further include comparing the measured differential pressure $dp_m$ with the expected differential pressure $dp_e$ (step 716). Step 716 may be performed if the comparison conducted in step 710 results in the diagnosis of an improperly-sized damper (step 712). If the measured differential pressure does not exceed the expected differential pressure (e.g., $dp_m \leq dp_e$), process 700 is shown to include diagnosing an oversized damper parameter (step 718). The diagnosis of an oversized damper parameter may imply that the damper parameter specified in the damper software configuration is larger than the actual damper size. For example, an oversized damper size parameter may result in the damper opening only a small amount to achieve a target flow rate. The small amount by which the damper opens may result in a flow rate significantly lower than expected because the actual damper size may be smaller than the assumed damper size. The lower flow rate may result in a lower-than-expected differential pressure measurement (e.g., $dp_m \leq dp_e$).

Referring again to step 716, if the measured differential pressure exceeds the expected differential pressure (e.g., $dp_m > dp_e$), process 700 is shown to include diagnosing an undersized damper parameter (step 720). The diagnosis of an undersized damper parameter may imply that the damper parameter specified in the damper software configuration is smaller than the actual damper size. The smaller-than-actual damper size parameter may result in the damper opening more than necessary to achieve a target flow rate. The extra airflow caused by the excessive opening may result in a higher-than-expected differential pressure measurement (e.g., $dp_m > dp_e$).

Figure 8:
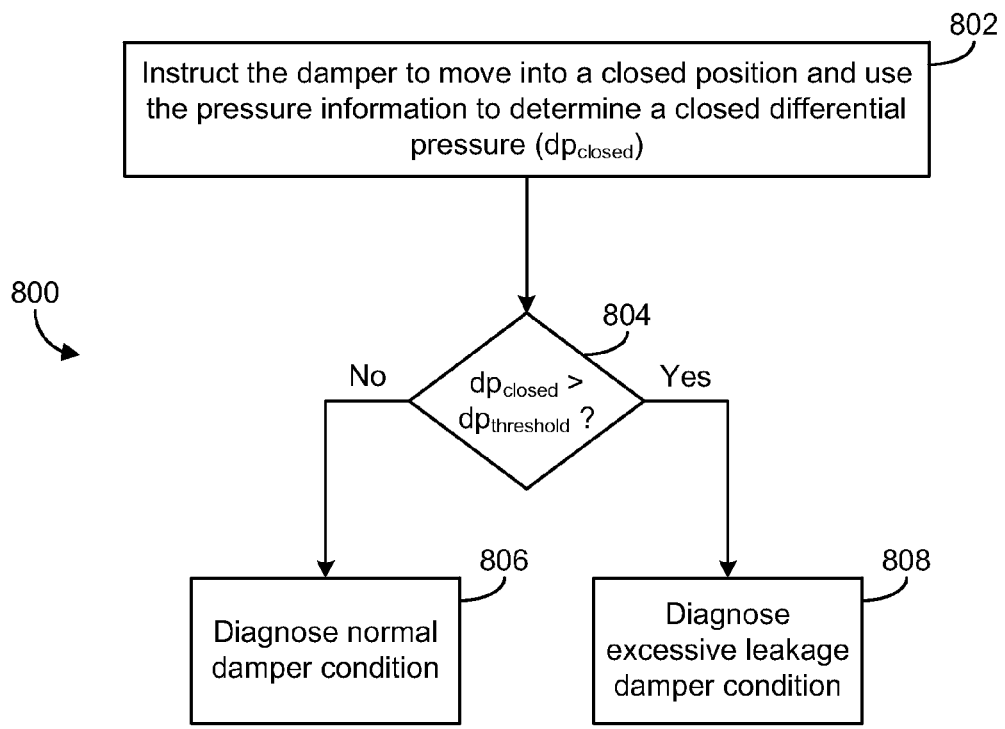
FIG. 8 is a flowchart of a process illustrating the excessive leakage damper diagnostic, according to an exemplary embodiment.

Referring now to FIG. 8, a flowchart of a process 800 for conducting the excessive damper leakage diagnostic is shown, according to an exemplary embodiment. Process 800 may be used to diagnose an excessive leakage damper condition. The excessive leakage damper condition may occur when the damper inadequately prevents airflow through the flow control unit when the damper is in a completely closed position. Excessive leakage may be caused, for example, by a physical obstruction preventing the damper from completely closing, a faulty actuator, or an improperly-calibrated operating range.

Process 800 may be used to determine a calibration error associated with a tested damper. For example, during an automated sensor calibration process, the damper may be instructed to move into a completely closed position. A pressure sensor associated with the damper may be calibrated by recording a differential pressure reading when the damper is presumed to be completely closed. The recorded differential pressure may be subtracted from all subsequent differential pressure values output by the sensor. If the damper is not completely closed when the calibration process is performed or if excessive leakage occurs despite the damper being completely closed, the subsequent differential pressure measurements may be inaccurate. Inaccurate pressure measurements may cause suboptimal control functionality, potentially resulting in undesirable performance or unnecessary energy use. Process 800 may detect excessive leakage (e.g., leakage exceeding a threshold value).

Still referring to FIG. 8, process 800 is shown to include instructing the damper to move into a closed position and using the pressure information to determine a closed differential pressure $dp_{closed}$ (step 802). The closed differential pressure $dp_{closed}$ may be determined after instructing the damper to move into the closed position based on the pressure information received from the pressure sensor(s). In some embodiments, step 802 may involve waiting for a defined time period after instructing the damper to move into the closed position before collecting the measurements used to determine the closed differential pressure $dp_{closed}$.

In some embodiments, the damper may be instructed to move into a completely closed position only if other dampers associated with a shared AHU are at least partially open. This may prevent an over-pressurization that may occur if all dampers associated with the AHU are closed simultaneously. In some embodiments, a supervisory controller for the AHU may prevent all dampers from closing simultaneously. In some embodiments, the supervisory controller may prevent a damper from closing if other dampers associated with the AHU are already closed. In some embodiments, the supervisory controller may randomize the times at which process 800 or step 802 is performed such that not all dampers are closed simultaneously.

Process 800 is shown to further include comparing the closed differential pressure $dp_{closed}$ with a differential pressure threshold $dp_{threshold}$ (step 804). The differential pressure threshold $dp_{threshold}$ threshold may be an upper threshold corresponding to a maximum an allowable leakage. The differential pressure threshold may be specified by a user (e.g., manually input) or determined automatically based on a history of differential pressure measurements. The maximum allowable leakage may be an allowable limit on the leakage of gas or fluid through the damper when the damper is in the closed position. Leakage in excess of the differential pressure threshold may imply that the damper is in need of repair, replacement, or recalibration. If the closed differential pressure does not exceed the differential pressure threshold (e.g., $dp_{closed} \leq dp_{threshold}$), process 800 is shown to include diagnosing a normal damper condition (step 806). If the closed differential pressure exceeds the differential pressure threshold (e.g., $dp_{closed} > dp_{threshold}$), process 800 is shown to include diagnosing an excessive leakage damper condition (step 808).

Advantageously, as shown in FIGS. 5-8, the stuck damper diagnostic, the predictive failure damper diagnostic, the improperly-sized damper diagnostic, and the excessive leakage damper diagnostic may be conducted using only differential pressure as a measured variable. This advantage facilitates implementation of the damper performance diagnostics at a local controller level rather than requiring that such diagnostics be performed at higher levels within the control system. Additionally, performing the described diagnostics on the local controller level may accurately and conveniently identify a particular flow control unit for closer inspection rather than requiring maintenance personnel to inspect several potentially faulty units.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for diagnosing a damper condition in a flow control unit, the method comprising:
    providing a control signal to a damper, wherein the control signal instructs the damper to move into a target position or to achieve a target flow rate through the flow control unit;
    obtaining a differential pressure value using a measurement from a pressure sensor of the flow control unit;
    using the differential pressure value and the control signal to conduct a damper performance diagnostic process including an improperly-sized damper diagnostic process; and
    outputting a result of the damper performance diagnostic process to at least one of: a user interface device, a local memory, and communications electronics;

wherein the improperly-sized damper diagnostic process comprises:
receiving a damper size parameter;
instructing the damper to move into an operating position and using a measurement from the pressure sensor to determine a measured differential pressure, wherein the measurement is obtained after instructing the damper to move into the operating position;
estimating an expected differential pressure based on the damper size parameter and the operating position;
calculating a difference between the measured differential pressure and the expected differential pressure; and
diagnosing an improperly-sized damper condition in response to the difference exceeding a differential pressure threshold.

2. The method of claim 1, wherein the damper performance diagnostic process is conducted by a local controller for the flow control unit using only the differential pressure value as a measured variable.

3. The method of claim 1, wherein the damper performance diagnostic process comprises:
instructing the damper to move into an open position;
using a measurement from the pressure sensor to determine an open differential pressure, wherein the measurement is obtained after instructing the damper to move into the open position;
comparing the open differential pressure to a pressure threshold; and
determining that no flow is occurring through the flow control unit in response to the open differential pressure not exceeding the pressure threshold.

4. The method of claim 3, wherein, in response to a determination that no flow is occurring, the damper performance diagnostic process further comprises:
updating the open differential pressure using an updated measurement from the pressure sensor; and
repeating the 'comparing,' 'determining,' and 'updating' steps until the open differential pressure exceeds the pressure threshold.

5. The method of claim 1, wherein the damper performance diagnostic process further includes a stuck damper diagnostic process comprising:
instructing the damper to move into a first position and using a first measurement from the pressure sensor to determine a first differential pressure, wherein the first measurement is obtained after instructing the damper to move into the first position;
instructing the damper to move into a second position and using a second measurement from the pressure sensor to determine a second differential pressure, wherein the second measurement is obtained after instructing the damper to move into the second position;
calculating a difference between the first differential pressure and the second differential pressure; and
diagnosing a stuck damper condition in response to the difference not exceeding a stuck damper pressure threshold.

6. The method of claim 5, wherein the first position is an open damper position and the second position is a closed damper position.

7. The method of claim 1, wherein the damper performance diagnostic process further includes a predictive damper failure diagnostic process comprising:
instructing the damper to move into a first position and using first measurement from the pressure sensor to determine a first differential pressure, wherein the first measurement is obtained after instructing the damper to move into the first position;
instructing the damper to move from the first position toward a second position, wherein a time at which the damper begins moving defines a beginning of a movement interval and a time at which the damper stops moving defines an end of the movement interval;
using a second measurement from the pressure sensor to determine a second differential pressure, wherein the second measurement is obtained at the end of the movement interval;
calculating a rate of change between the determined differential pressures by dividing a difference between the first differential pressure and the second differential pressure by a duration of the movement interval;
calculating a difference between the calculated rate of change and an expected rate of change; and
predicting a damper failure in response to the difference between the calculated rate of change and the expected rate of change exceeding a threshold rate of change.

8. The method of claim 1, wherein diagnosing an improperly-sized damper condition comprises:
determining whether the measured differential pressure exceeds the expected differential pressure; and
one of:
diagnosing that the damper size parameter is undersized in response to the measured differential pressure exceeding the expected differential pressure, and
diagnosing that the damper size parameter is oversized in response to the measured differential pressure not exceeding the expected differential pressure.

9. The method of claim 1, wherein the damper performance diagnostic process further includes a damper leakage diagnostic process comprising:
instructing the damper to move into a closed position and using a measurement from the pressure sensor to determine a closed differential pressure, wherein the measurement is obtained after instructing the damper to move into the closed position;
comparing the closed differential pressure to a differential pressure threshold; and
diagnosing an excessive leakage damper condition in response to the closed differential pressure exceeding a differential pressure threshold.

10. A system for diagnosing a damper condition in a flow control unit, the system comprising:
a pressure sensor configured to obtain one or more pressure measurements in the flow control unit; and
a controller configured to obtain a differential pressure value using the one or more pressure measurements and to provide a control signal to a damper, wherein the control signal instructs the damper to move into a target position or to achieve a target flow rate through the flow control unit,
wherein the controller is further configured to use the differential pressure value and the control signal to conduct a damper performance diagnostic process including an improperly-sized damper diagnostic process;
wherein the controller is further configured to output a result of the damper performance diagnostic process to at least one of: a user interface device, a local memory, and communications electronics;
wherein the improperly-sized damper diagnostic process comprises the steps of:
receiving a damper size parameter;
instructing the damper to move into an operating position and using a measurement from the pressure sensor to determine a measure differential pressure, wherein the measurement is obtained after instructing the damper to move into the operating position;
estimating an expected differential pressure based on the damper size parameter and the operating position;
calculating a difference between the measured differential pressure and the expected differential pressure;
diagnosing an improperly-sized damper condition in response to the difference exceeding a differential pressure threshold.

11. The system of claim 10, wherein the controller is a local controller for the flow control unit and wherein the damper performance diagnostic process uses only the differential pressure value as a measured variable.

12. The system of claim 10, wherein the damper performance diagnostic process comprises the steps of:
instructing the damper to move into an open position;
using a measurement from the pressure sensor to determine an open differential pressure, wherein the measurement is obtained after instructing the damper to move into the open position;
comparing the open differential pressure to a pressure threshold; and
determining that no flow is occurring through the flow control unit in response to the open differential pressure not exceeding the pressure threshold.

13. The system of claim 12, wherein, in response to a determination that no flow is occurring, the damper performance diagnostic process further comprises the steps of:
updating the open differential pressure using an updated measurement from the pressure sensor; and
repeating the 'comparing,' 'determining,' and 'updating' steps until the open differential pressure exceeds the pressure threshold.

14. The system of claim 10, wherein the damper performance diagnostic process further includes a stuck damper diagnostic process comprising the steps of:
instructing the damper to move into a first position and using a first measurement from the pressure sensor to determine a first differential pressure, wherein the first measurement is obtained after instructing the damper to move into the first position;
instructing the damper to move into a second position and using a second measurement from to pressure sensor to determine a second differential pressure, wherein the second measurement is obtained after instructing the damper to move into the second position;
calculating a difference between the first differential pressure and the second differential pressure; and
diagnosing a stuck damper condition in response to the difference not exceeding a stuck damper pressure threshold,
wherein the first position is an open damper position and the second position is a closed damper position.

15. The system of claim 10, wherein the damper performance diagnostic process further includes a predictive damper failure diagnostic process comprising the steps of:
instructing the damper to move into a first position and using a first measurement from the pressure sensor to determine a first differential pressure, wherein the first measurement is obtained after instructing the damper to move into the first position;
instructing the damper to move from the first position toward a second position, wherein a time at which the damper begins moving defines a beginning of a movement interval and a time at which the damper stops moving defines an end of the movement interval;
using a second measurement from the pressure sensor to determine a second differential pressure, wherein the second measurement is obtained at the end of the movement interval;
calculating a rate of change between the determined differential pressures by dividing a difference between the first differential pressure and the second differential pressure by a duration of the movement interval;
calculating a difference between the calculated rate of change and an expected rate of change; and
predicting a damper failure in response to the difference between the calculated rate of change and the expected rate of change exceeding a threshold rate of change.

16. The system of claim 10, wherein diagnosing an improperly-sized damper condition comprises the steps of:
determining whether the measured differential pressure exceeds the expected differential pressure; and
one of:
diagnosing that the damper size parameter is undersized in response to the measured differential pressure exceeding the expected differential pressure, and
diagnosing that the damper size parameter is oversized in response to the measured differential pressure not exceeding the expected differential pressure.

17. The system of claim 10, wherein the damper performance diagnostic process further includes a damper leakage diagnostic process comprising the steps of:
instructing the damper to move into a closed position and using a measurement from the pressure sensor to determine a closed differential pressure, wherein the measurement is obtained after instructing the damper to move into the closed position;
comparing the closed differential pressure to a differential pressure threshold; and
diagnosing an excessive leakage damper condition in response to the closed differential pressure exceeding a differential pressure threshold.

18. One or more non-transitory computer-readable media having instructions for diagnosing a damper condition in a flow control unit stored therein, the instructions being executable by one or more processors to cause the one or more processors to perform operations comprising:
providing a control signal to a damper, wherein the control signal instructs the damper to move into a target position or to achieve a target flow rate through the flow control unit;
obtaining a differential pressure value using a measurement from a pressure sensor of the flow control unit;
using the differential pressure value and the control signal to conduct a damper performance diagnostic process including an improperly-sized damper diagnostic process; and
outputting a result of the damper performance diagnostic process to a user interface device;
wherein the damper performance diagnostic is conducted by a local controller for the flow control unit using only the differential pressure value as a measured variable;
wherein the improperly-sized damper diagnostic process comprises:
receiving a damper size parameter;
instructing the damper to move into an operating position and using a measurement from the pressure sensor to determine a measured differential pressure, wherein the measurement is obtained after instructing the damper to move into the operating position;
estimating an expected differential pressure based on the damper size parameter and the operating position;

calculating a difference between the measured differential pressure and the expected differential pressure; and diagnosing an improperly-sized damper condition in response to the difference exceeding a differential pressure threshold.

* * * * *